April 11, 1967 M. LOPEZ-HENRIQUEZ 3,313,890

MAXIMUM DENSITY MAGNETIC RECORDING APPARATUS

Filed Feb. 28, 1962 3 Sheets-Sheet 1

MAXIMUM DENSITY MAGNETIC RECORDING APPARATUS

Filed Feb. 28, 1962 3 Sheets-Sheet 2

United States Patent Office 3,313,890

Patented Apr. 11, 1967

3,313,890

MAXIMUM DENSITY MAGNETIC RECORDING APPARATUS

Miguel Lopez-Henriquez, 240 W. 73rd St., New York, N.Y. 10019

Filed Feb. 28, 1962, Ser. No. 176,344

12 Claims. (Cl. 179—100.2)

The present invention relates to magnetic tape recorders—the term "recorder" being used in a broad sense to include equipment for recording electrical signals on magnetic tape and also playback equipment for reproducing electrical signals from a recording on magnetic tape. The equipment may thus be referred to as a transducer. The invention further relates to a new method of tape recording and to the resulting records.

In recording complex, multiple or rapid signals, for example video signals, on magnetic tape, the tape speed required is so high as to make the size of the reels and of the tape handling equipment impractical. In an effort to solve the problem of recording complex signals with lower tape speed, it has been proposed that to use a plurality of magnetic heads on a disc or a carrier mounted for rotation with its axis perpendicular to the plane of the tape and rotated at high speed so that the heads successively sweep across the tape in arcs extending transversely of the tape. However, such equipment is relatively large, complex and heavy so that it is not suitable for portable equipment. Moreover, with this system of recording, it is necessary to leave spaces between successive arcs of the recording on the tape, so that only a portion of the tape area can be used for the recording. These spaces materially increase the overall length of the tape.

It is an object of the present invention to provide a system of tape recording in accordance with which the signals are recorded in narrow, straight bands extending transversely across the tape. Greater efficiency in use of the tape is achieved by recording the signals in such a manner that succesive bands of the recording on the tape lie immediately adjacent one another without spaces between. Despite the contiguousness of successive bands, "cross-talk" between the bands is avoided by arranging the lines of magnetization of successive bands at a substantial angle to one another. By reason of the entire area of the tape being used for the recording, a shorter tape can be used for a given recording or conversely more can be recorded on a given tape.

A further object of the invention is to provide tape recording equipment which will record complex signals, but is sufficiently simple and lightweight that it can be used where portability is required. Such equipment is particularly suitable for use where the bulk and weight of the equipment must be as low as possible.

In accordance with the invention, the recording head comprises at least one drum which is rotatable about an axis parallel to the plane of the tape and extending transversely to the length of the tape. The drum is provided on its periphery with one or more magnetic gaps extending spirally or helically about the drum. A pressure bar holds a narrow, transverse band of the tape in contact with the periphery of the drum. As the drum rotates while the tape is moved in a lengthwise direction by suitable tape transport mechanism, a small zone of coincidence between the bar and the magnetic gap of the rotating drum moves transversely of the tape so that a signal fed to the gap is recorded on a narrow band extended transversely across the tape. Preferably the head comprises two drums so arranged that one drum records on the tape in transverse bands spaced apart a distance equal to the width of the band while the other drum records the resulting spaces so that substantially the entire tape area is used. "Cross-talk" is prevented by having the gap of one drum spiral in a direction opposite to that of the gap on the other drum so that magnetic lines in successive bands are disposed at a substantial angle to one another. By reason of this angular relationship, the playback head, which is similarly arranged, picks up the signal of one band without being affected by the preceding and succeeding bands.

The objects, characteristics and advantages of the invention will be more fully understood from the following description of preferred embodiments of the invention illustrated by way of example in the annexed drawings in which.

Figure 1:
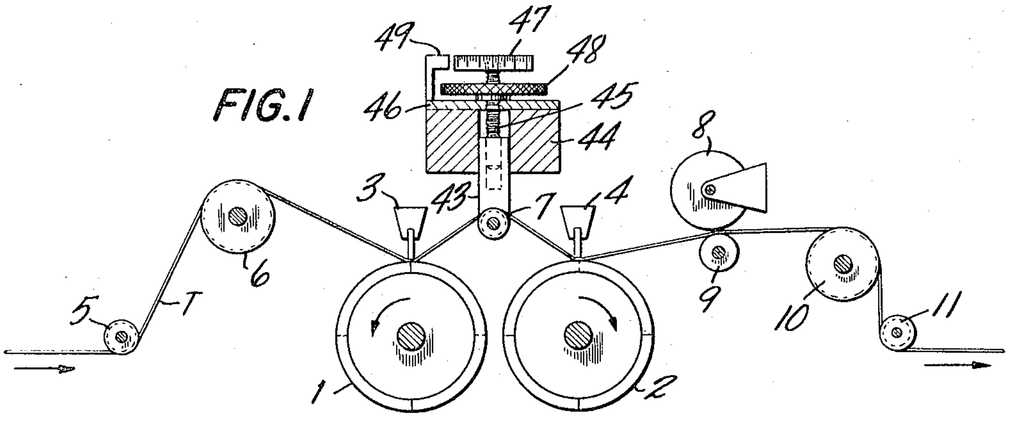
FIGURE 1 is a schematic view of a portion of a tape recorder in accordance with the invention, certain parts being shown in section and others in elevation.

As illustrated in FIGURES 1 to 4, apparatus for recording electrical signals on a magnetic tape T, or reproducing electrical signals recorded on the tape, comprises two rotating drums or heads 1 and 2 mounted for rotation about axes which are substantially parallel to one another and extend transversely to the length of the tape. Suitable tape transport mechanism is provided to cause the tape to travel successively past the drums 1 and 2. The tape is brought into close contact with the peripheries of the drums by narrow pressure bars 3 and 4 associated respectively with the two drums. As illustrated by way of example in FIGURE 1, the tape transport comprises a stabilizer roller 5, an idler roller 6, an adjustable guide roller 7 disposed between the two drums, a pinch roller 8 associated with a capstan 9, an idler roller 10 and a stabilizer roller 11. The pinch roller 8 is spring biased to press the tape firmly into engagement with the capstan 9 which is driven at a selected constant speed to advance the tape past the drums 1 and 2 at a selected linear speed. The tape coming from a suitable supply reel (not shown) passes over the stabilizer roller 5 and idle roller 6, between the periphery of the drum 1 and the associated pressure bar 3 which holds the tape into close contact with the drum, over the adjustable guide roller 7, between the drum 2 and associated pressure bar 4, between the capstan 9 and the associated pinch roller 8 and over the idler roller 10 and stabilizer roller 11 to a suitable take-up reel (not shown).

Figure 2:
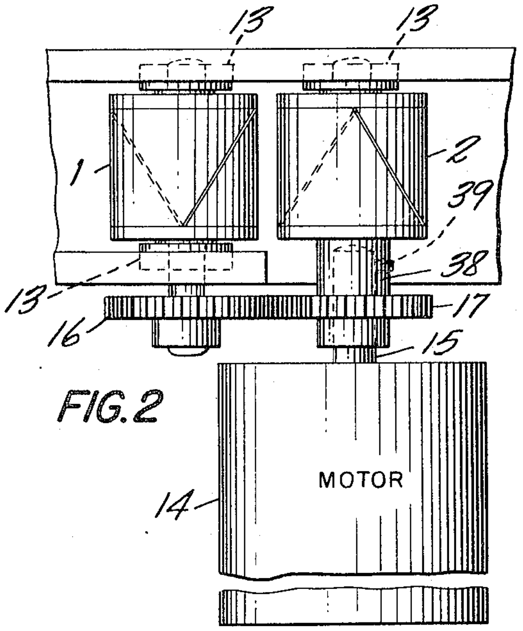
FIGURE 2 is a schematic plan showing two rotating drums of the recorder and the means for driving the drums.

The drums 1 and 2 are rotatively supported by suitable bearings which are illustrated as ball bearings 13 and are driven at a selected speed in opposite directions and in synchronism with one another. As illustrated in FIGURE 2, the two drums are driven by a motor 14 having a drive shaft 15 which is coaxial with, and coupled directly to, one of the drums 2. The other drum 1 is driven at the same speed, but in the opposite direction, by intermeshing gears 16 and 17 fixed respectively on the shafts of the drums 1 and 2. The capstan 9 is also driven in precise time and speed relationship with the drums 1 and 2. It may conveniently be driven from the same motor 14 through suitable gears (not shown) or from a separate motor which is synchronized with motor 14. The drum speed and tape speed may be suitably selected in accordance with the nature of the signal it is desired to record and the several parameters of the recorder. As an example, the capstan 9 may be driven at a speed providing a linear tape speed of 15 inches per second and the drums 1 and 2 may be rotated in opposite directions at a speed of 14,500 r.p.m.

Figure 3:
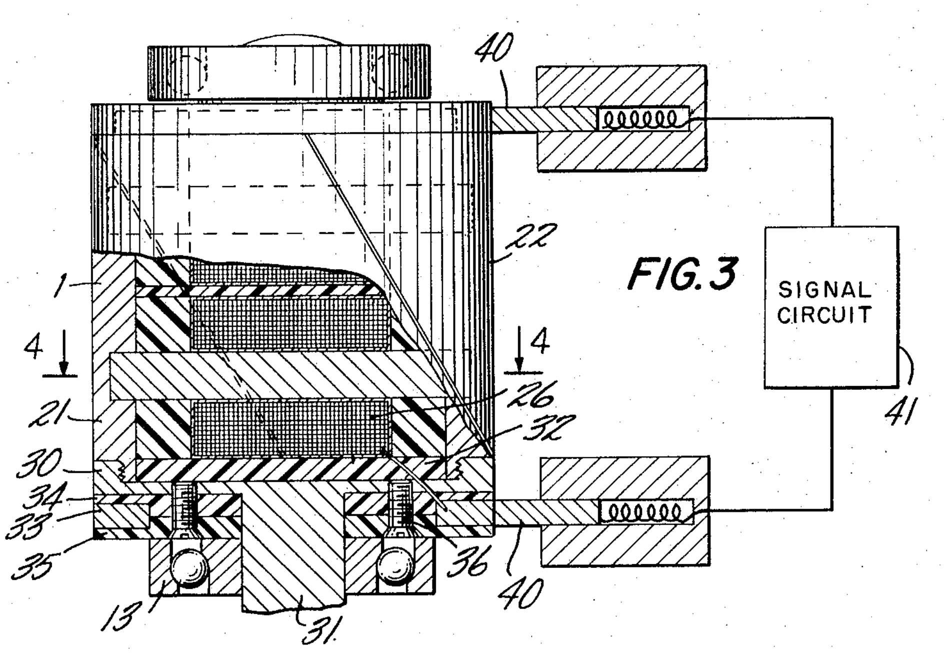
FIGURE 3 is an enlarged view, partially in section, showing one of the drums and illustrating schematically electrical connections from a signal circuit to windings provided in the drum.
Figures 4, 5:
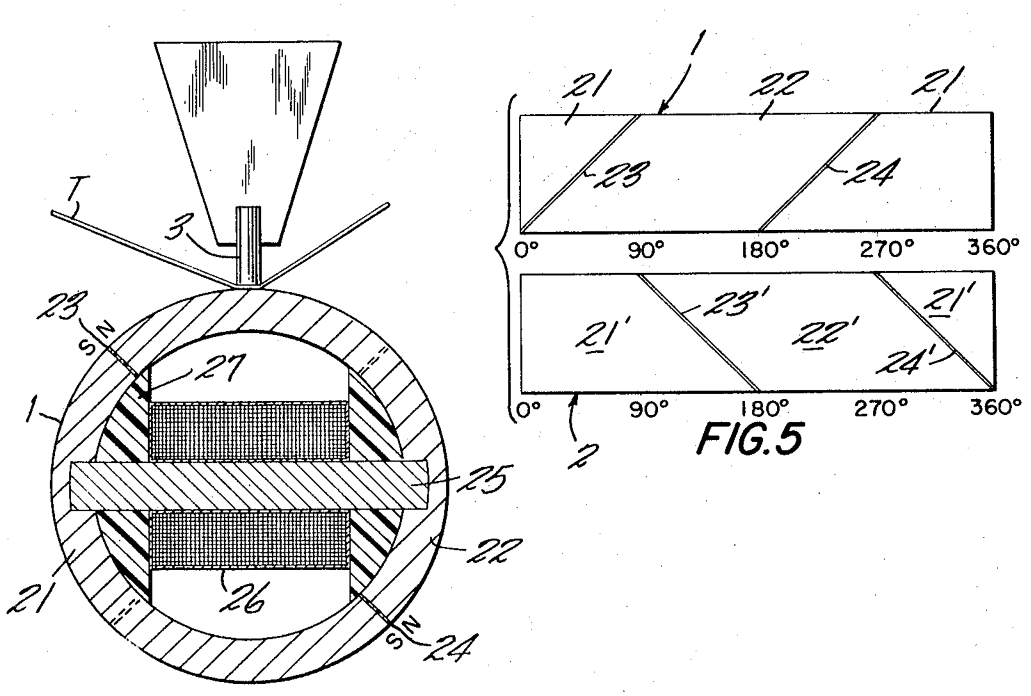
FIGURE 4 is a cross-section view taken approximately on the line 4—4 in FIGURE 3.
FIGURE 5 is a schematic developed view of the peripheries of the two drums shown one above the other in order to illustrate the phase relationship of the magnetic gaps of the drums.

The pressure bars 3 and 4 are spring pressed or otherwise arranged to hold a narrow transverse band of the tape in intimate contact with the periphery of the respective drum. As will be seen in FIGURES 1 and 4, the idler roller 6 and the guide roller 7 are offset relative to the pressure bar 3, so that the only portion of the tape in contact with drum 1 is the portion engaged by the pressure bar 3. Similarly, the guide roller 7 and capstan 9 are offset relative to the pressure bar 4, so that the only portion of the tape in engagement with drum 2 is that engaged by the bar 4. The thickness of the bar thus defines the width of a narrow transverse band of tape which at any instance is in contact with the respective drum. As an example, each pressure bar may have a thickness of 0.0075 inch. The face of the bar which engages the tape is preferably concave, with a radius approximately equal to the radius of the drum, so that the bar conforms accurately to the periphery of the drum. Each of the drums 1 and 2 constitutes a magnetic recording head and is provided with at least one magnetic gap which extends spirally or helically on the periphery of the drum. For convenience and economy of construction and operation, each of the drums is shown provided with two gaps. As illustrated in FIGURES 3 and 4, and the schematic illustration of FIGURE 5, each drum comprises two arcuate pole pieces 21 and 22 formed of magnetic permeable material, for example soft iron. In the developed view shown in FIGURE 5, the pole pieces 21 and 22 are of parallelogram shape and are slightly spaced from one another to provide narrow gaps 23 and 24 which are either air gaps or filled with non-magnetic material such as plastic. The gaps 23 and 24 are narrow, having a width, for example, of 80 micro-inches plus or minus 20 micro-inches. As seen in FIGURES 3 and 5, the gaps 23 and 24 are equi-distance from one another and spiral around the periphery of the drum. In the preferred embodiment illustrated in FIGURE 5, each gap spirals one quarter of the way around the drum so that opposite ends of each gap are spaced 90° apart and the two gaps are spaced 180° from one another. The second drum 2 likewise comprises pole pieces 21′ and 22′ arranged to provide the gaps 23′ and 24′ which are the same as gaps 23 and 24 of the first drum 1, but spiral in the opposite direction.

The pole pieces 21 and 22 form part of a magnetic circuit and are interconnected by two core portions 25 extending diametrically of the drum and spaced axially from one another. The core pieces 25 are shown in the form of bars of magnetically permeable material, such as soft iron, having their end portions fitted into recesses provided in the respective pole pieces so as to provide intimate interengagement with a junction of low reluctance. Each of the core pieces 25 is surrounded by a magnetic coil or winding 26 positioned by spacers 27 of non-magnetic material such as plastic. When the windings 26 are energized with electric current, they set up a magnetic field in the magnetic circuit comprising the pole pieces 21 and 22 and the core pieces 25. At any instance, the pole piece 21 will have one polarity and the pole piece 22 will have the opposite polarity depending on the direction of the current flow. The portions of the pole pieces defining the opposite sides of the gaps 23 and 24 are thus of opposite polarity and produce magnetic lines of force across the gap. The two windings 26 are in additive relationship so that the total flux produced is the sum of that produced by both windings.

At opposite ends of the drum, internally threaded caps 30 having coaxial shaft portions 31 screw onto reduced externally threaded portions provided at the ends of pole pieces 21 and 22. A spacing disc 32 of insulating non-magnetic material is provided between the inner face of each cap 30 and the adjacent winding 26. The shaft portions 31 are rotatively supported by the ball bearings 13. At one end, the shaft portion is suitably extended to receive the driving gear 16. A slip ring 33 of conductive material having a low co-efficient of friction and a high wear resistance is mounted at each end of the drum by being held between insulating discs 34 and 35 secured to the cap 30 by a plurality of recessed screws 36. The construction of the other drum 2 is the same, except that the cap member at one end of the drum is provided with a socket 38 to receive the motor shaft 15 and a set screw 39 to provide a driving connection between the motor and the drum.

The slip rings 33 are connected to the terminals of the windings 26, which are arranged either in series or in parallel with one another as desired. Spring pressed brushes 40 engage the slip rings 33 and are connected to the circuitry of the tape recorder illustrated schematically as a signal circuit 41. When the transducer is being used as a recorder, the electrical signal which is to be recorded is suitably amplified and fed through the brushes 40 and slip rings 33 to the windings 26 so as to vary the current in the windings and thereby vary the magnetic field across the gaps 23 and 24 in accordance with the signal. When the transducer is being used for reproducing a recorded signal, variations in magnetic flux produced by the tape induce a flow of current in the windings 26 which is transmitted out through the slip rings 33 and brushes 40 and suitably amplified in the circuit 41. The signal circuit thus represents an output circuit in one instance and an input circuit in the other. The circuitry may include suitable means for switching from recording to a playback. As circuitry of this kind is well known, no details of the circuit are shown. The brushes 40 are preferably formed of high conductivity and low resistance material such as silver graphite to avoid losses in the contact between the brushes and the slip rings.

The guide roller 7 located between the two drums 1 and 2 is rotatively carried by a frame 43 which is slidable in a guide block 44 in a direction toward and away from a plane passing through the axes of the drums 1 and 2. The position of the slide 43 and hence of the roller 7 with respect to the drums is precisely controlled by a threaded shaft 45 rotatively supported by a bearing plate 46 and rotatable by means of a disc 47 fixed on its outer end. An inner end of the portion of the threaded shaft 45 screws into a threaded bore in the frame 43, so that the frame can be moved inwardly or outwardly by rotation of the threaded shaft 45 in one direction or the other by means of the disc 47. A lock nut 48 threaded on the shaft 45 can be screwed down tight against the bearing plate 46 so as to lock the shaft securely in selected positions. The disc 47 is preferably calibrated by providing on its periphery graduations adapted to be read at an index pointer 49. As will appear more fully below, the precise position of the guide roller 47 provides a convenient means for adjusting the phase relationship between the recordings produced respectively on the tape by drums 1 and 2 and also for establishing correct phase relationship between the drums when the apparatus is used for a playback.

Figure 6:
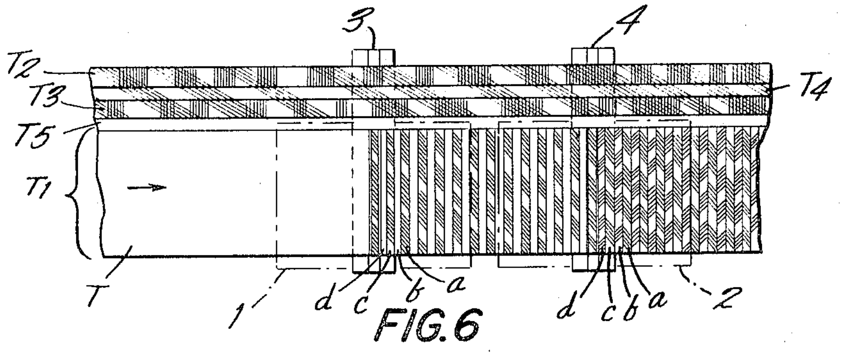
FIGURE 6 is a schematic view showing a section of magnetic tape on which a recording is being made and illustrating schematically the process of recording in accordance with the invention.

The novel method of recording on magnetic tape in accordance with the present invention is illustrated in FIGURES 5 and 6 considered in conjunction with FIGURES 1 to 4 and the above description of the apparatus. With the drum 1 in the position shown in FIGURE 4, it will be apparent that the pressure bar 3 crosses the spirally extended gap 23 intermediate its end and that there is thus a small area of coincidence where the pressure bar 3 and gap 23 intersect. Moreover, by reference to FIGURE 5, it will be apparent that as the drum 1 rotates on its axis, the area of coincidence between the pressure bar 3 and the gap 23 will move from one end of the drum to the opposite end and thus move in a direction transverse of the tape T. Thus, when the 0° point on the drum is opposite the pressure bar, the area of coincidence will be at the lower end of the drum as illustrated in FIGURE 5. When the drum has turned to 45°, the area of coincidence will be midway between the ends of the drum. When the drum has turned 90°, the area of coincidence will be at the opposite end of the drum. As the drum 1 turns from 90° to 180°, neither gap of the drum coincides with the pressure bar 3. As the drum turns from 180° to 270°, the area of coincidence between the second gap 24 and the pressure bar 3 moves from the lower to the upper end of the drum. During the movement of the drum from 270° to 360°, neither gap coincides with the pressure bar. It will thus be seen that the area of coincidence between the pressure bar and the gaps 23 and 24 move successively lengthwise of the drum and thus transversely of the tape T. At any instance, there is only a narrow band of the tape T in contact with the periphery of the drum, namely a band having a width equal to the thickness of the pressure bar 3. As indicated above, the width of the band may be of the order of point 0.0075 inch. Thus, the area of coincidence between the gaps 23 and 24 and the narrow band of tape in contact with the drum moves as described above in a direction transverse of the tape. As the tape is moving forward while the drum rotates, the locus of the area of coincidence between the tape and the gap is not exactly perpendicular to the length of the tape, but is inclined at an angle depending on the speed of rotation of the drum and the linear speed of the tape. However, if the speed is low (for example 15 inches per second) in comparison with the rotational speed of the drum (for example, 14,500 r.p.m.) the locus of the area of coincidence between the gap and the tape is approximately 90° and for convenience is shown as 90° in FIGURE 6.

When an electrical signal is fed to the windings 26 of the drum while the drum is rotated and the tape moves forward, the electrical signal is recorded on the area of the tape which at each instance coincides with one or another of the gaps 23 and 24. By reason of the transverse movement of the area of coincidence as explained above, the recording will be made on a narrow band of tape which extends transverse to the length of the tape. For example, as the drum 1 rotates from zero position to a 90° position, a recording will be made on a narrow band designated *a* in the FIGURE 6. As the drum turns from its 90° position to its 180° position while the tape continues to move forwardly, there is no recording on the tape in a narrow band designated *b* in FIGURE 6. During the next 90° of movement from 180° to 270°, a recording is made on a narrow band *c* of the tape by the second gap 24 of drum 1. During rotation of the drum from its 270° position to its 360° position, neither of the gaps coincides with the pressure bar and hence there is a further space *d* in which there is no recording on the tape. The width of the unrecorded bands *b* and *d* is substantially the same as the width of the recorded bands *a* and *c*. By reason of the angular position of the gap 23 or 24 with reference to the pressure bar 3 at any instance the magnetic lines of force between the two poles defining the gap are disposed at an angle of other than 90° to the pressure bar and hence the direction in which the magnetic material of the tape is magnetized does not extend directly across the respective magnetized bands *a* and *c*, but is instead disposed at an angle of other than 90°. The direction of magnetization is accordingly indicated in FIGURE 6 by oblique lines which are arranged to indicate different degrees of magnetization so as schematically to represent a signal that is recorded on the tape. It will thus be seen that after passing the first drum 1, the tape will have narrow spaced transverse bands *a, c,* etc. in which a signal has been recorded and intervening a band *b, d,* etc. which are still blank.

The second drum 2, records on narrow spaced transverse bands of the tape in the same manner as the first drum 1. However, the phase relation between the first drum and the second drum is selected so that the second drum records on bands *b, d,* etc. interposed between the bands *a, c,* etc. on which the first drum recorded. The phase relationship between the two drums is indicated schematically in FIGURE 5 and is accurately controlled by means of the adjustable guide roller 7 shown in FIGURE 1. It will be seen that the movement of the guide roller in a direction away from a plane passing through the axes of the drums increases the effective length of tape between the pressure bars 3 and 4 and thereby shifts relative to one another the bands on which the respective drums record. Conversely, the movement of the rollers 7 toward the drums shifts the phase relationship in the opposite directions. The same signal is fed to the windings of both drums and the phase relationship between the drums is such that the second drum is recording during the intervals in which the first drum is not recorded. The second drum thus fills in the spaces left between the bands of recording by the first drum. While the respective gaps are illustrated in FIGURE 5 as extending 90° in a circumferential direction, it is preferable to have each gap extend slightly more than 90° in order to afford a slight amount of tolerance in adjustment of the phase relation of the two drums. However, as will be pointed out below no "cross-talk" would occur between adjacent bands of the recording even if they were to overlap slightly.

As seen in FIGURES 2 and 5, the two drums 1 and 2 rotate in opposite directions and the gaps 23′ and 24′ of the second drum 2 spiral around the drum in the opposite direction from gaps 23 and 24 on the first drum 1. Consequently, the lines of force produced by the gaps 23′ and 24′ of the second drum are inclined in the opposite direction with respect to the transverse bands of the recording and are hence at a substantial angle, for example, 45° to 90° with respect to the lines of force of the first drum. The direction of magnetization of the magnetic particles in bands *b* and *d* recorded by the second drum are thus at a corresponding angle with relation to the direction of magnetization of the particles in the bands *a* and *c* recorded by the first drum. When the record thus produced is played back through the same or similar equipment, the phase relation of the tape with respect to the drums is adjusted so that the first drum picks up the signal recorded by the first drum and the second drum picks up the signal which was recorded by the second drum. Thus, the first drum picks up the signal recorded in bands *a, c,* etc. while the second drum picks up the signals that are recorded in bands *b, d,* etc. Since the direction of magnetization in bands *b, d,* etc. is at a substantial angle to the direction of magnetization in bands *a, c,* etc., the first drum does not pick up the signals from bands *b, d,* etc. and conversely the second drum does not pick up the signals from bands *a, c,* etc. It is hence, unnecessary to provide an unrecorded "guard" space between successive bands in order to prevent "cross-talk."

For convenience and clarity of illustration in FIGURE 6, the bands of recording *a, b, c, d,* etc. are shown schematically as being perpendicular to the length of the tape and hence certain bands coincide with pressure bars 3 and 4, the positions which are schematically illustrated. However, it will be understood that by reason of the linear movement of the tape T and the rotation of the recording drums 1 and 2, the bands *a, b, c, d,* etc. will be inclined slightly so that the beginning of one band coincides—in a lengthwise direction—with the end of the proceeding band. The linear tape speed, the width of the pressure bars 3 and 4 and the speed of the rotation of the drums are coordinated to provide the relationship between the bands illustrated in FIGURE 6. In FIGURE 6, the recording by drums 1 and 2 is shown as occupying a track T–1 which occupies only a portion of the width of the tape. There are also additional tracks T–2 and T–3 with guard bands T–4 and T–5 between the several tracks. If for example, the tape is used for television recording, the track T–1 recorded by drums 1 and would be the video track, track T–2 would be the control track and track T–3, the cue track. Tracks T–2 and T–3 are recorded in usual manner by stationary heads having gaps extended transversely of the tape. The recordings in tracks T–2 and T–3 are represented by lines drawn perpendicular to the length of the tape and grouped to show varying intensities of signals. Additionally, there is an audio signal extending over tracks T–2 and T–3 and the guard band T–4 and is recorded by a stationary head having a gap disposed at an angle of approximately 45° to the length of the tape. The recording of this audio signal is represented by diagonal lines extending across tracks T–2 and T–3 and the guard band T–4. When the tape is played back, heads registering respectively with tracks T–2 and T–3 and having gaps perpendicular to the tape, will pick up the control and cue signals respectively, while a head having a gap disposed at an angle approximately 45° to the length of the tape will pick up the audio signal. By reason of the angular relation of the direction of magnetization of the audio signal with respect to the control and the cue signals, the respective heads pick up only the intended signal. As an example of appropriate dimensions of the tape, the tape may have a width of one inch, with the control track T–2 40 mils wide, the guard band T–4 10 mils wide, the cue track T–3 20 mils wide, the guard band T–5 20 mils wide and the video track T–1 910 mils wide. The stationary heads for the control, cue and audio signals may be located, as convenient, ahead of, between or after the drums 1 and 2 for recording the video signal.

Figure 8:
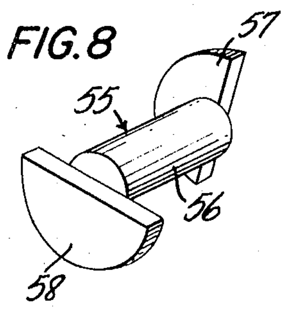
FIGURE 8 is a perspective view of a magnetic core portion of the drum shown in FIGURE 7.
Figure 7:
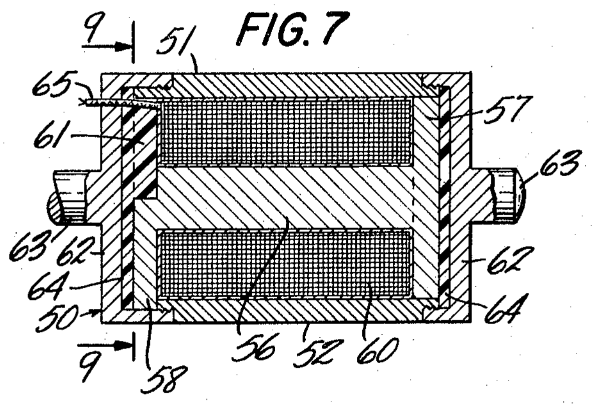
FIGURE 7 is a longitudinal section showing another form of drum construction.
Figure 9:
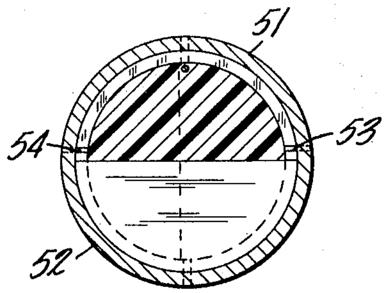
FIGURE 9 is a cross-section taken approximately on the line 9—9 in FIGURE 7.

In FIGURES 7 to 9, there is shown an embodiment of a recording head in the form of a rotating drum 50. The drum comprises arcuate pole pieces 51 and 52, which are formed of magnetically permeable material and slightly spaced from one another to provide non-magnetic gaps 53 and 54. A core 55 (FIGURE 8) comprises a central stem portion 56 which extends axially of the drum and opposite wing portions 57 and 58, all of magnetically permeable material and preferably integral with one another. The wings 57 and 58 are disposed at an angle of approximately 90° to one another so that when the core is assembled with the shells as shown in FIGURE 8, one of the wings 57 will engage the pole piece 51 while the other wing 58 will engage the opposite pole piece 52. A magnetic coil 60 is wound around the stem portion 56 of the core. Semi-circular filler pieces 61 of non-magnetic insulating material preferably complement the semi-circular wing portions 57 and 58 so as to provide complete circular flanges for guiding and confining the winding of the core. Internally threaded cap portions 62 having integral coaxial shaft portions 63 screw onto reduced threaded end portions of the pole pieces forming the shell of the drum. Spacing discs 64 of non-magnetic insulating material are interposed between the inner faces of the caps 62 and the ends of the core 55. Leads 65 are provided for connecting the winding 60 to the external circuitry, for example, through suitable slip rings and brushes for example like those shown in FIGURE 3, except that both slip rings may be located on the same end of the drum. The construction illustrated in FIGURES 7 to 9 provides convenient manufacture and assembly of the drum.

Figure 11:
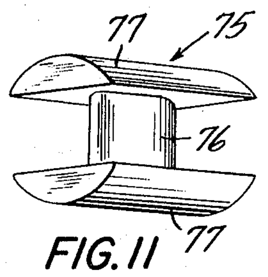
FIGURE 11 is a perspective view of a core portion of the head shown in FIGURE 10.
Figure 10:
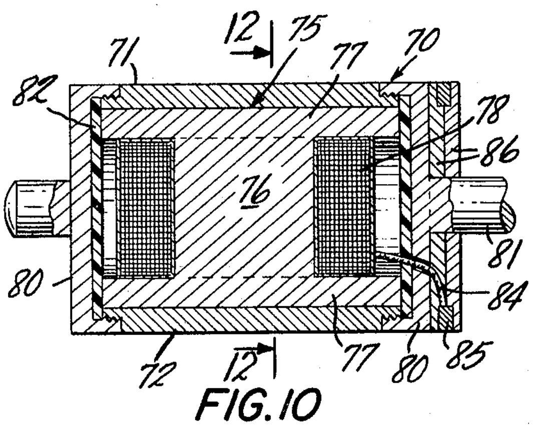
FIGURE 10 is a longitudinal section of still another form of drum for the recording head.
Figure 12:
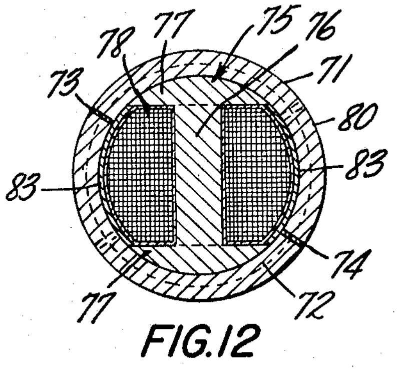
FIGURE 12 is a cross-section taken approximately on the line 12—12 in FIGURE 10, with portions broken away to show a winding in the drum.

Still another form of drum is illustrated in FIGURES 10, 11, and 12. The drum 70 comprises arcuate pole pieces 71 and 72 of magnetically permeable material shaped to provide spiral gaps 73 and 74. A core 75 is H-shaped in both cross-section and in longitudinal section and comprises a stem portion 76 extending diametrically of the drum and opposite flange portions 77 which extend lengthwise of the drum and have arcuate outer surfaces fitting the inner surfaces of pole piece 71 and 72 respectively. A coil 78 is wound around the stem portions 76 of the core, the axis of the coil being thus diametrical of the drum. Cap portion 80 having integral shaft portions 81 are screwed onto reduced externally threaded end portions of the shell to hold the shell and the core in assembled relationship. Spacing discs 82 of non-magnetic and non-conductive material are interposed between the inner faces of the caps 80 and the ends of the core 75. Arcuate pieces 83 of brass, plastic or other non-magnetic material are brazed or otherwise secured inside the shell and fit between the flanges 77 of the core to position the core accurately with respect to the poles of the shell. A lead 84 from the winding 78 is connected to a slip ring 85 held between two insulating discs 86 secured for example by screws (not shown) to the outer face of the cap 80 at one end of the drum. The opposite terminal of coil 78 may be brought to a second slip ring (not shown) or grounded. The rotating heads shown respectively in FIGURES 7 to 9 and 10 to 12 are mounted and operate as described with reference to FIGURES 1 to 6.

Figure 13:
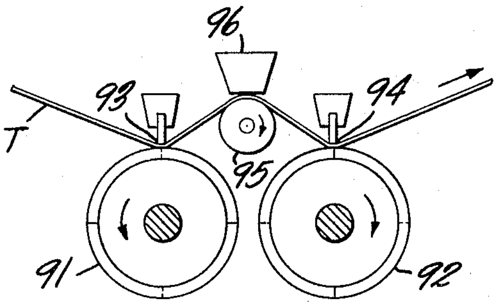
FIGURE 13 is a schematic view showing an alternative arrangement.

In FIGURE 13 there is illustrated schematically a convenient arrangement for mounting the auxiliary heads for recording additional tracks, for example the control, cue and audio tracks illustrated in FIGURE 6. The video track T–1 (FIGURE 6) is recorded by rotating drums 91 and 92 having pole pieces with helical gaps as described with reference to FIGURE 1 to 4. Pressure bars 93 and 94 are associated respectively with rotating drums 91 and 92. Between the two drums, and offset laterally from a plane passing through the axes of the drums, there are provided a guide roller 95 and an associated head assembly 96 containing one or more additional recording heads. For example, the assembly 96 may contain heads disposed at right angles to the direction of the travel of the tape for recording the control track T–2 and cue track T–3 of the tape shown in FIGURE 6, while a stationary recording head records the audio track overlined tracks T–2 and T–3. The tape is held in close contact with the auxiliary heads by the guide roller 95. Preferably the entire head assembly and associated guide roller 95 are mounted on a movable slide 43 illustrated in FIGURE 1 to provide for phase adjustment between the drums 91 and 92. In FIGURE 13, the tape is preferably coated on both sides with magnetic material. The drums 91 and 92 extend the full width of the tape and record on one side of the tape while the head 96 records on the opposite side. Because of the angular relation of the lines of magnetization, there is no cross-talk between the tracks. This arrangement permits the use of a still narrower tape.

While it is preferable to use two co-ordinated drums as shown and described to make full utilization of the tape area, it will be understood that the apparatus can be used with only one drum. In this event, it may be desirable to provide the drum with additional gaps in order to reduce the unused space between successive transverse recorded bands. For example, the drum may comprise four pole pieces providing four gaps. In this event, each gap preferably spirals around the drum a circumferential distance slightly more than 90°. Alternatively the recording head may comprise a single drum having two gaps each spiraling around the drum a circumferential distance of substantially 180°. In either case when a single drum is used, the tape transport system is operated in timed relation with the rotation of the drum so as to leave a slight space between successive recorded bands extending transversely of the tape.

The several features of the embodiments herein shown and described are mutually interchangeable in so far as they are compatible. In the embodiment illustrated in FIGURE 2, the motor 14 may preferably be connected directly to the first drum 1, the second drum 2 being driven through suitable gears of other driving connection. Still other modifications of the invention will be apparent to those skilled in the art. It is accordingly not intended to limit the invention to the preferred embodiments shown by way of example in the drawings and herein particularly described.

What I claim and desire to secure by Letters Patent is:

1. In a transducer for recording on or reproducing from magnetic tape, a rotatable drum comprising on its periphery two opposite pole portions of magnetically permeable material separated by a narrow non-magnetic gap extending spirally of said drum, a magnetic winding in said drum having poles magnetically coupled respectively with said pole portions, electrical connections between said winding and a signal circuit, a narrow stationary pressure bar extending lengthwise along the periphery of said drum, said pressure bar having a concave edge facing said drum and adapted to hold a narrow sharply defined transverse zone of said tape in intimate contact with said drum through the width of said zone, tape transport means for transporting tape at a selected lineal speed between said pressure bar and said drum in a direction transverse to said bar, said transport means guiding said tape in a V-shaped path with said edge of said bar at its vertex, and means for rotating said drum at a selected speed in timed relation with said tape transport means so that a narrow sharply defined zone of coincidence between said gap and the portion of tape between said drum and bar moves transversely of said tape as said tape is moved forward by said transport means.

2. In a transducer according to claim 1, further transducing means which is stationary and in position to engage said tape as it is moved by said transport means, said further transducing means comprising means defining a first stationary magnetic gap extending substantially perpendicular to the direction of movement of said tape and means defining a second stationary magnetic gap extending at substantial angles to said first stationary magnetic gap and to the direction of movement of said tape.

3. A transducer according to claim 1, comprising a single rotating drum with said gap spiraling 360° around said drum.

4. In a transducer according to claim 1, further transducing means which is stationary and in position to engage said tape as it is moved by said transport means, said further transducing means comprising means defining a magnetic gap extending transversely of said tape at a substantial angle to the direction of said gap of said drum in said zone of coincidence with said bar.

5. A transducer according to claim 4, adapted to record on or reproduce from tape having magnetic coatings on its opposite faces in which said stationary transducing means and said drum engage respectively opposite faces.

6. In a transducer for recording on or reproducing from magnetic tape, two rotatable drums each comprising on its periphery two opposite pole portions of magnetically permeable material separated by a narrow non-magnetic gap extending spirally around a selected circumferential portion only of said drum, another circumferential portion of said drum being without a gap to provide a circumferential space between gap portions, a core portion of magnetically permeable material connecting said opposite pole portions, a magnetic winding around said core portion, electrical connections between said winding and a signal circuit, a narrow pressure bar extending lengthwise along the periphery of each of said drums, tape transport means for transporting tape at a selected linear speed successively past said drums, said tape passing between said pressure bars and said drums in a direction transverse to said bars whereby a narrow band of said tape extending transversely thereof is held in contact with the periphery of each of said drums by the respective bar, and means for rotating said drums at a selected speed in timed relation with one another and with the tape transport means so that zones of coincidence between said gaps and said narrow bands of tape between said drums and bars move transversely of said tape as said tape is moved forwardly, successive zones of coincidence with the said gap of each said drum being spaced apart by reason of said circumferential space between gap portions, said drums having such phase to one another and being so spaced in relation to the tape transport means that said zones of coincidence with said gap of one drum are intercalated in said spaces between said zones of coincidence with the said gap of other drum.

7. A transducer according to claim 6, in which said gap of one drum spirals around said drum in a direction opposite to that in which said gap of the other drum spirals around said other drum, and in which said drums rotate in opposite directions.

8. A transducer according to claim 7, in which a single motor drives both of said drums.

9. A transducer according to claim 6, in which said pole portions of each of said drums are separated from one another by two narrow non-magnetic gaps which are uniformly spaced from one another circumferentially of said drum and in which said zones of coincidence with said gaps of one drum are intercalated between said zones of coincidence with said two gaps of the other drum.

10. A transducer according to claim 9, in which said film transport means comprise movable tape guide means disposed between said drums and means for precisely moving said guide means to vary the length of tape between said bars, thereby accurately positioning said respective zones of coincidence relative to one another.

11. A transducer according to claim 10, further comprising further transducing means associated with said guide means, said tape passing over said further transducing means in traveling between said drums.

12. A transducer according to claim 11, in which said further transducing means is stationary and has spaced pole pieces separated by a non-magnetic gap which extends at an angle substantially less than ninety degrees to the direction of travel of said tape.

References Cited by the Examiner

UNITED STATES PATENTS

| | | | |
|---|---|---|---|
| 2,989,595 | 6/1961 | Hunter | 179—100.2 |
| 3,040,124 | 6/1962 | Camras | 178—6.6 |
| 3,075,049 | 1/1963 | Gordon et al. | 179—100.2 |
| 3,077,587 | 2/1963 | Springer | 179—100.2 X |

FOREIGN PATENTS

| | | |
|---|---|---|
| 174,220 | 3/1953 | Australia. |

OTHER REFERENCES

Buslik, IBM Technical Disclosure Bulletin, vol. 3, No. 4, page 25, September 1960.

BERNARD KONICK, *Primary Examiner.*

IRVING L. SRAGOW, *Examiner.*

M. S. GITTES, *Assistant Examiner.*